United States Patent
Durre (10) Patent No.: US 6,998,045 B2
(45) Date of Patent: *Feb. 14, 2006

(54) SPIN-ON FILTER INCLUDING IMPROVED SEALING ARRANGEMENT AND FILTER HEAD THEREFOR

(75) Inventor: Reynold Frederick Durre, Stevens Point, WI (US)

(73) Assignee: Donaldson Company, Inc., Minneapolis, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 10/972,031

(22) Filed: Oct. 22, 2004

(65) Prior Publication Data

US 2005/0051477 A1 Mar. 10, 2005

Related U.S. Application Data

(62) Division of application No. 10/132,982, filed on Apr. 26, 2002, now Pat. No. 6,823,996.

(51) Int. Cl.
B01D 27/08 (2006.01)

(52) U.S. Cl. ............... 210/249; 210/443; 210/450; 210/456; 210/DIG. 17

(58) Field of Classification Search ............... 210/249, 210/435, 440, 443, 444, 450, 456, DIG. 17; 220/378, 614, 618, 620
See application file for complete search history.

(56) References Cited

U.S. PATENT DOCUMENTS

| | | | |
|---|---|---|---|
| 2,888,141 A | | 5/1959 | Coates et al. |
| 3,036,711 A | | 5/1962 | Willhelm |
| 3,061,101 A | | 10/1962 | Humbert, Jr. |
| 3,307,705 A | * | 3/1967 | Halmenschlager ....... 210/433.1 |
| 3,616,933 A | | 11/1971 | Baldwin |
| 4,237,015 A | * | 12/1980 | Fearnhead .................. 210/444 |
| 4,369,113 A | * | 1/1983 | Stifelman ................... 210/440 |
| 4,764,275 A | * | 8/1988 | Robichaud .................. 210/232 |
| 4,832,844 A | | 5/1989 | Ayers |
| 5,013,434 A | | 5/1991 | Furrow |

(Continued)

FOREIGN PATENT DOCUMENTS

CA 583608 9/1959

(Continued)

*Primary Examiner*—Matthew O. Savage
(74) *Attorney, Agent, or Firm*—Merchant & Gould PC (57) ABSTRACT

A fluid filter assembly includes a housing having a closed end and an open end; a filter element operably oriented in the housing; a baffle plate mounted to operably cover the housing open end; the baffle plate including a first axial face and an outer circumferential wall circumscribing the first axial face; the outer circumferential wall being groove-free; the first axial face defining at least a first sealing groove; and a sealing gasket oriented in the first sealing groove; the sealing gasket forming a seal between the housing and the baffle plate. Methods of constructing, installing, and servicing includes fluids filters of the type described.

8 Claims, 6 Drawing Sheets

U.S. PATENT DOCUMENTS

| | | |
|---|---|---|
| 5,024,870 A | 6/1991 | Jackson |
| 5,104,537 A | 4/1992 | Stifelman et al. |
| 5,114,575 A | 5/1992 | Yano et al. |
| 5,342,519 A | 8/1994 | Friedmann et al. |
| 5,476,585 A | 12/1995 | Mills |
| 5,605,625 A | 2/1997 | Mills |
| 5,681,461 A | 10/1997 | Gullett et al. |
| 5,702,602 A | 12/1997 | Brown et al. |
| 5,906,736 A | 5/1999 | Bounnakhom et al. |
| 5,996,810 A | 12/1999 | Bounnakhom et al. |
| 6,045,693 A | 4/2000 | Miller et al. |
| 6,224,754 B1 * | 5/2001 | Schiavon et al. ........... 210/130 |
| 6,345,721 B1 | 2/2002 | Durre et al. |
| 6,823,996 B1 * | 11/2004 | Durre ........................ 210/443 |

FOREIGN PATENT DOCUMENTS

| | | | |
|---|---|---|---|
| FR | 1 490 916 | | 8/1967 |
| FR | 1490916 | * | 8/1967 |
| RU | 1736566 A1 | * | 5/1992 |

* cited by examiner

SPIN-ON FILTER INCLUDING IMPROVED SEALING ARRANGEMENT AND FILTER HEAD THEREFOR

This application is a divisional application of application Ser. No. 10/132,982, filed Apr. 26, 2002, now U.S. Pat. No. 6,823,996. Application Ser. No. 10/132,982 is incorporated by reference herein.

TECHNICAL FIELDS

This disclosure concerns generally a fluid filter. In particular, this disclosure relates to a filter incorporating an improved seal arrangement.

BACKGROUND

Filters have been employed in a variety of applications including hydraulic systems and engine lubrication systems. Such filter assemblies generally include a cylindrical filter element within a can or housing with a baffle or attachment plate at one end to connect the filter to a filter head, typically by a threaded joint. A central opening and several surrounding openings in the baffle direct flow through the filter and, in particular, the filter element. The flow can be in either an inside-out (forward flow) or an outside-in (reverse flow) pattern. A circular gasket serves as a seal between the baffle and the can or housing.

Various models and designs of filters have been known over the years. Each design improves on an aspect of these filters. Continued improvement in filters are desired.

SUMMARY OF THE DISCLOSURE

In one aspect, a fluid filter assembly is provided. The fluid filter assembly includes a housing having a closed end and an open end; a filter element operably oriented in the housing; a baffle plate mounted to operably cover the housing open end; the baffle plate including a first axial face defining at least a first sealing groove; and a sealing gasket oriented in the first sealing groove; the sealing gasket forming a seal between the housing and the baffle plate.

In other aspects, methods of constructing, installing, and servicing includes fluids filters of the type described.

DETAILED DESCRIPTION

A. Overall Assembly; Systems of Use

Figure 1:
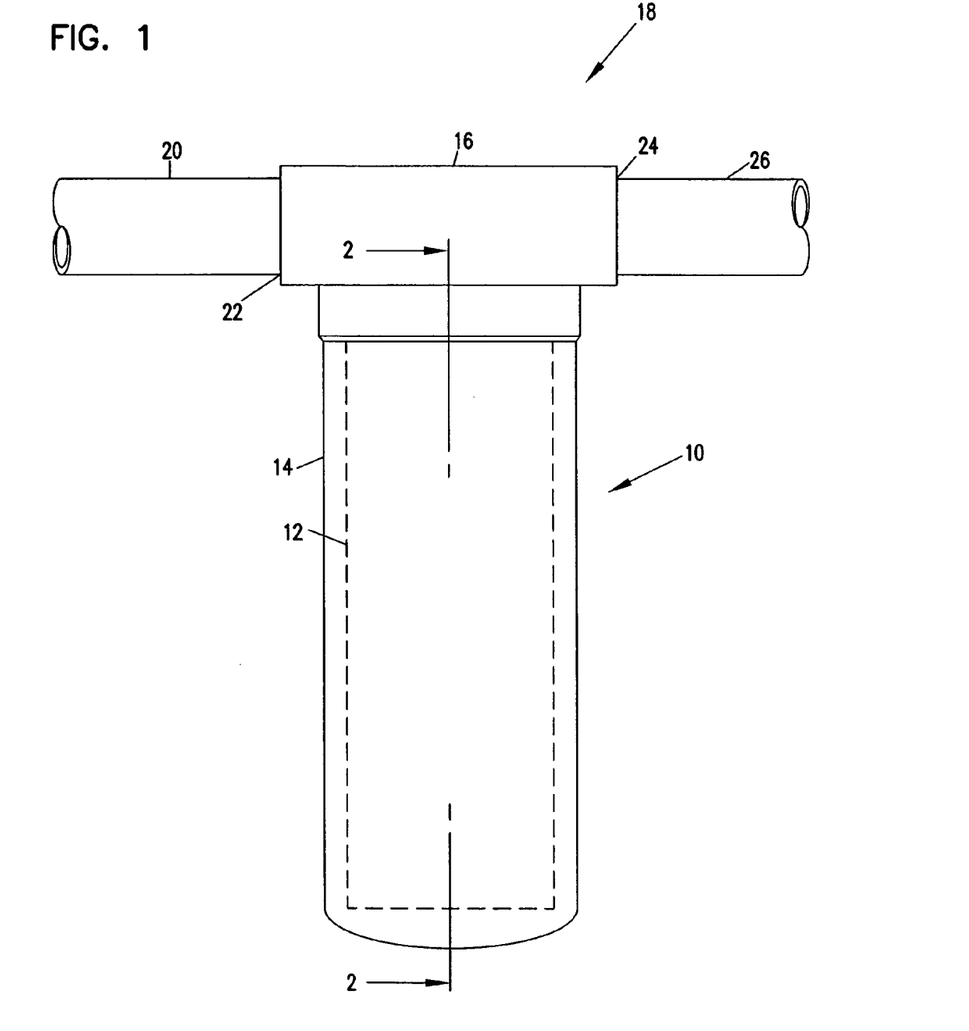
FIG. 1 is a schematic view of a filter assembly secured to a filter head, constructed according to principles of this disclosure.

Referring first to FIG. 1, there is illustrated a fluid filter assembly 10. Filter assembly 10 is particularly adapted for filtration of liquid, for example oil, as for example in a hydrostatic transmission or other hydraulic system. The filter assembly 10 includes a filter cartridge or element 12 (FIG. 2) operably oriented in a can or housing 14. The filter assembly 10 is operably mounted to a filter block or filter head 16, typically by screwing the filter assembly 10 onto the filter head 16 by internal threads on the filter assembly 10.

The filter assembly 10 is utilized in a filtering system 18. The filtering system 18 includes a supply 20 for supplying dirty fluid to the filter assembly 10 through an inlet 22 of the filter head 16. The fluid enters and is filtered or cleaned by the filter element 12. The cleaned fluid exits the filter head 16 at an outlet 24 and is carried away by pipe 26.

Figure 5:
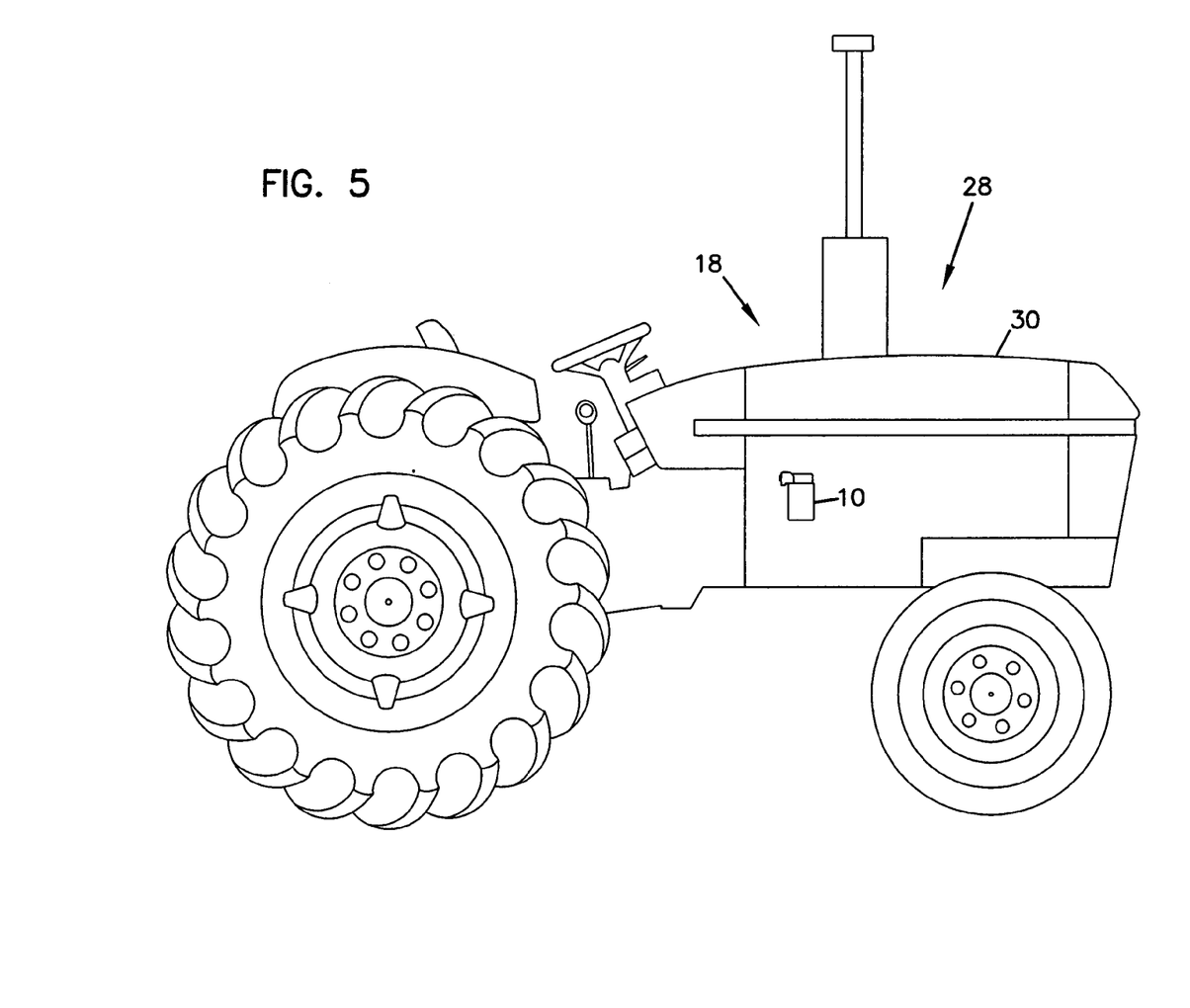
FIG. 5 is a side elevational view of a system incorporating the filter assembly of FIGS. 1–3.

In reference now to FIG. 5, one application for the filter assembly 10 is to remove particulate matter from hydraulic fluid that is used in a vehicle 28. In FIG. 5, the vehicle 28 depicted is a tractor 30. An example of a tractor is an agricultural tractor that has a hydrostatic transmission and a hydraulic system, both of which require a filter. The hydraulic system can be used for a variety of purposes including raising and lowering farm implements such as plows. A hydraulic system can also be used to raise and lower earth moving equipment such as blades, buckets, backhoes, and scrapers. Other applications for the filter assembly 10 include other farm equipment, construction equipment, skidders, loaders, off-road vehicles, over-the-highway trucks, automobiles, industrial machines, and other devices that require the filtering of fluids. Additionally, the filter assembly 10 can be used to remove foreign matter from a variety of different fluids. Examples of liquid fluids include other hydraulic fluids, engine lubrication oil, diesel fuel, gasoline, engine coolant, automatic transmission fluid and others.

B. Some Problems with Existing Filter Assemblies, FIG. 6

Figure 6:
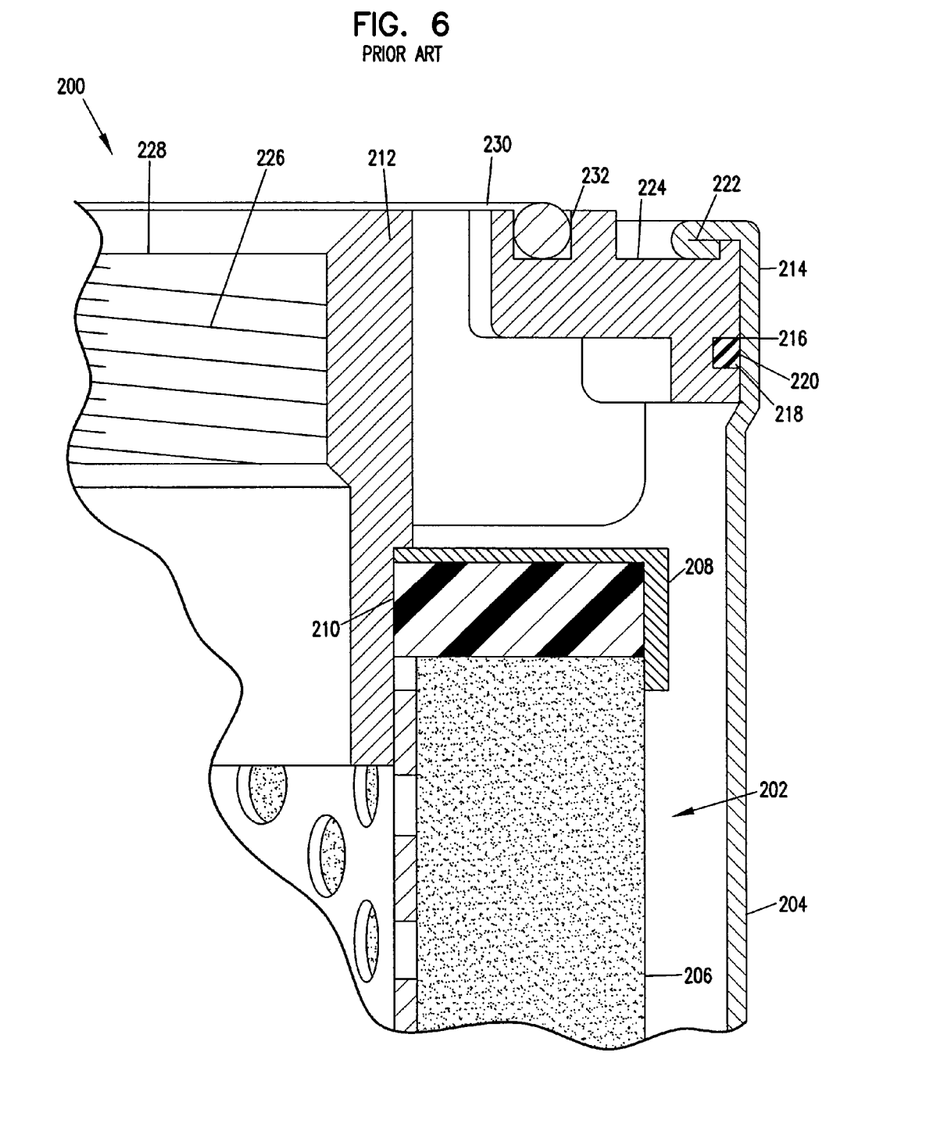
FIG. 6 is an enlarged cross-sectional view of a section of a prior art filter assembly.

Attention is next directed to FIG. 6 which depicts a portion of a prior art filter assembly 200. In the filter assembly 200, there is a filter element 202 held within an outer can or housing 204. The filter element 202 includes filter media 206 potted within an end cap 208. The end cap 208 includes an opening 210, which circumscribes a portion of a baffle plate 212. The baffle plate 212 is secured across an open end of the housing 204. The baffle plate 212 has an edge 214 that provides a mechanical interlock between the baffle plate 212 and the housing 204. The edge 214 forms the outer circumferential surface and outer periphery of the baffle plate 212. As such, the edge 214 is an outer annular surface. The edge 214 includes a groove 216 that holds a sealing gasket 218 therein to form a seal 220 between the baffle plate 212 and the housing 204. The housing 204 includes a fold 222 that engages a top, exterior surface 224 of the baffle plate 212 to help securely lock the baffle plate 212 and the housing 204 together.

The prior art filter assembly 200 can introduce certain problems. For example, the baffle plate 212 is die cast. The casting is then threaded to form threads 226 on an inside diameter 228 of the baffle plate 212. The outside diameter along edge 214 is machined to clean up the casting gates and overflows and the seal groove 216 is machined into the circumference.

Due to the depth of the groove 216 and the location of the groove 216 along the edge perimeter 214, the baffle plate 212 should be vacuum impregnated with a material, such as Loctite, to seal any porosity in the casting that has been exposed by the machining operation. The sealing gasket 218, usually a lathe-cut sealing gasket, is then placed into the groove 216. This gasket 218 has double chamfers and lubrication so that the baffle plate 212 can be pressed into the open end of the housing 204. Insufficient lubrication can cause the sealing gasket 218 to roll, or otherwise not be installed properly and result in a defective product.

After the sealing gasket 218 is installed and the element 202 is placed on the baffle plate 212, the entire assembly (element 202 and baffle plate 212) is pressed into the housing 204 and the filter is seamed using a single fold seam method to form fold 222. After painting (if desired), a molded O-ring face seal 230 is inserted into a face seal groove 232 on the top exterior surface 224 of the baffle plate 212.

C. Improved Filter Assembly 10, FIGS. 1–5

The filter assembly 10 of FIGS. 1–5 was designed to address problems of the prior art filter assembly 200. For example, it was recognized that if the sealing groove 216 were moved from the circumferential edge 214 to the top exterior surface 224 (the face) then the sealing gasket will be located in a groove that is cast into the face of the baffle plate instead of machined into the perimeter of it. As a result, machining time is reduced, the porosity that is exposed is negligible, and the requirement for impregnation of material (such as Loctite) is eliminated. In addition, in the filter assembly 10 of FIGS. 1–5, the sealing gasket does not need to have double chamfers, which results in cost savings. Further, when manufacturing new filter assembly 10, the sealing gasket is compressed by the seaming operation and does not have to be pressed into the housing. In the prior art filter assembly 200, pressing the baffle plate 212 with the sealing gasket 218 into the radial edge 214 requires a significant mount of force, and the sealing gasket 218 could roll, causing scrap and rework. Details of the improved filter assembly 10 are discussed below.

Figure 2:
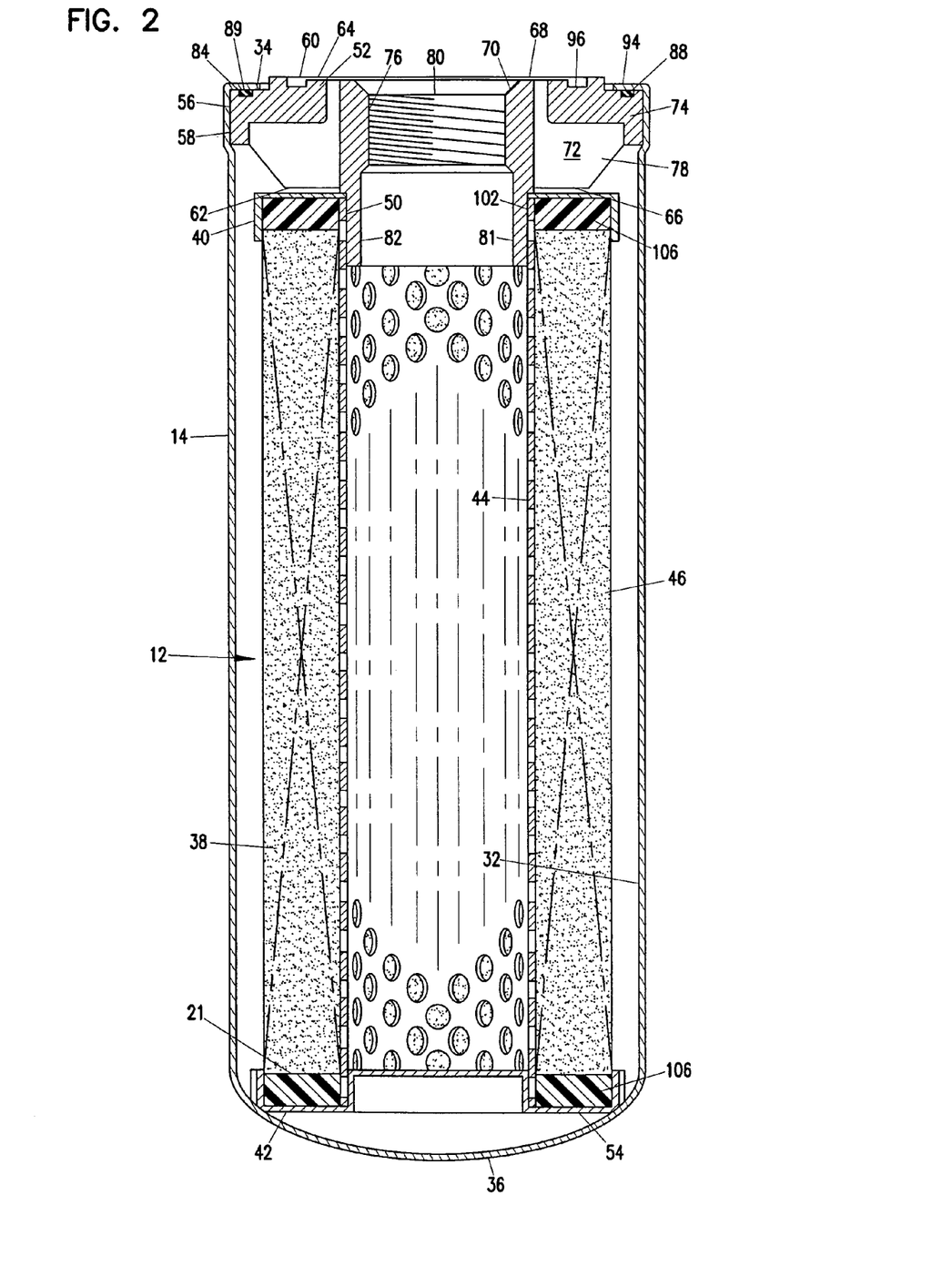
FIG. 2 is a cross-sectional view of the filter assembly taken along the line 2—2 of FIG. 1, the filter assembly including a filter element oriented within a can or housing.

In reference now to FIG. 2, the filter assembly 10 includes the filter element 12 operably oriented within the housing 14. The filter housing 14 has an interior volume 32 designed to accept the filter element 12 therein. The filter housing 14 generally has an open first end 34 and a closed second end 36. Preferably, the housing 14 is of generally thin-walled construction having sufficient rigidity to withstand the pressure experienced during typical filtering operations. Housing 14 is typically metal, plastic, or other suitable metal; if housing 14 is metal, it is typically formed by stamping or drawing from the metal.

The filter element 12 is located inside the interior volume 32. The filter element 12 includes a filtering material 38 for removing contaminants, such as particulate, from the fluid being filtered. Filtering material 38 extends from, and is potted within, a first end cap 40 and a second end cap 42. Filtering material 38 defines an open interior volume 44. Typically, the filtering material 38 is material such as cellulous, paper, non-woven material, synthetic material, and the like. The filter material 38 may be treated or coated to improve its filtering capabilities.

In the one shown, the filter material 38 includes filter media 46 that is generally a pleated, porous material, such as paper. A perforated tubular inner liner 48 can be included in the filter element 12. The inner liner 48 is surrounded by an extension of the filter media 46 and typically extends between the first and second end caps 40, 42.

The first end cap 40 is an open end cap and includes an opening 50 therein. The opening 50 receives, circumscribes, and surrounds a portion of a baffle plate 52. The baffle plate 52 is secured across the open end 34 of the housing 14. The second end cap 42 is a closed end cap that extends across and covers the end 21 of the filtering material 38 such that there cannot be access to the open interior volume 44 at end 54 of the filter element 12.

The baffle plate 52 conveys filtered liquid from the filter assembly 10 and provides a barrier that prevents the bypass of unfiltered liquid around the filtering material 38. The baffle plate 52 includes an outer, peripheral edge 56, that forms an outer circumferential wall 58 of the baffle plate 52. The wall 58 is also the outer radial surface of the baffle plate 52. The baffle plate 52 also includes axially directed surfaces 60, 62, which also correspond to a top end surface 64 and a bottom end surface 66. The top end surface 64 corresponds to a top face 68. The face 68 is generally in a plane that is orthogonal to the outer circumferential wall 58.

The baffle plate 52 includes a hub 70, in particular, a central axially extending hub that is interconnected by a plurality of radial webs or ribs 72 with a generally circular outer rim 74. The hub 70 defines a central opening 76, extending through the baffle plate 52 and terminating inside the filter element 12, in particular, inside the inner liner 48. Fluid passages 78 defined by the ribs 72 and the surrounding hub 70 allow liquid to flow therethrough and into the interior volume 32 of the filter housing 14.

Threads 80 are provided on the internal surface of the hub 70 for connecting the filter assembly 10 to the filter head 16 (FIG. 1). The hub 70 preferably extends below the ribs 72 and into the upper end of the filter element 12.

In the embodiment shown in FIG. 2, the filter element 12 is secured to the baffle plate 52 by direct connection or "potting" of the first end cap 40 to a neck 82 of the hub 70. This method of assembling a filter assembly is described further in commonly assigned U.S. Pat. No. 6,345,721, incorporated by reference herein.

Figure 3:
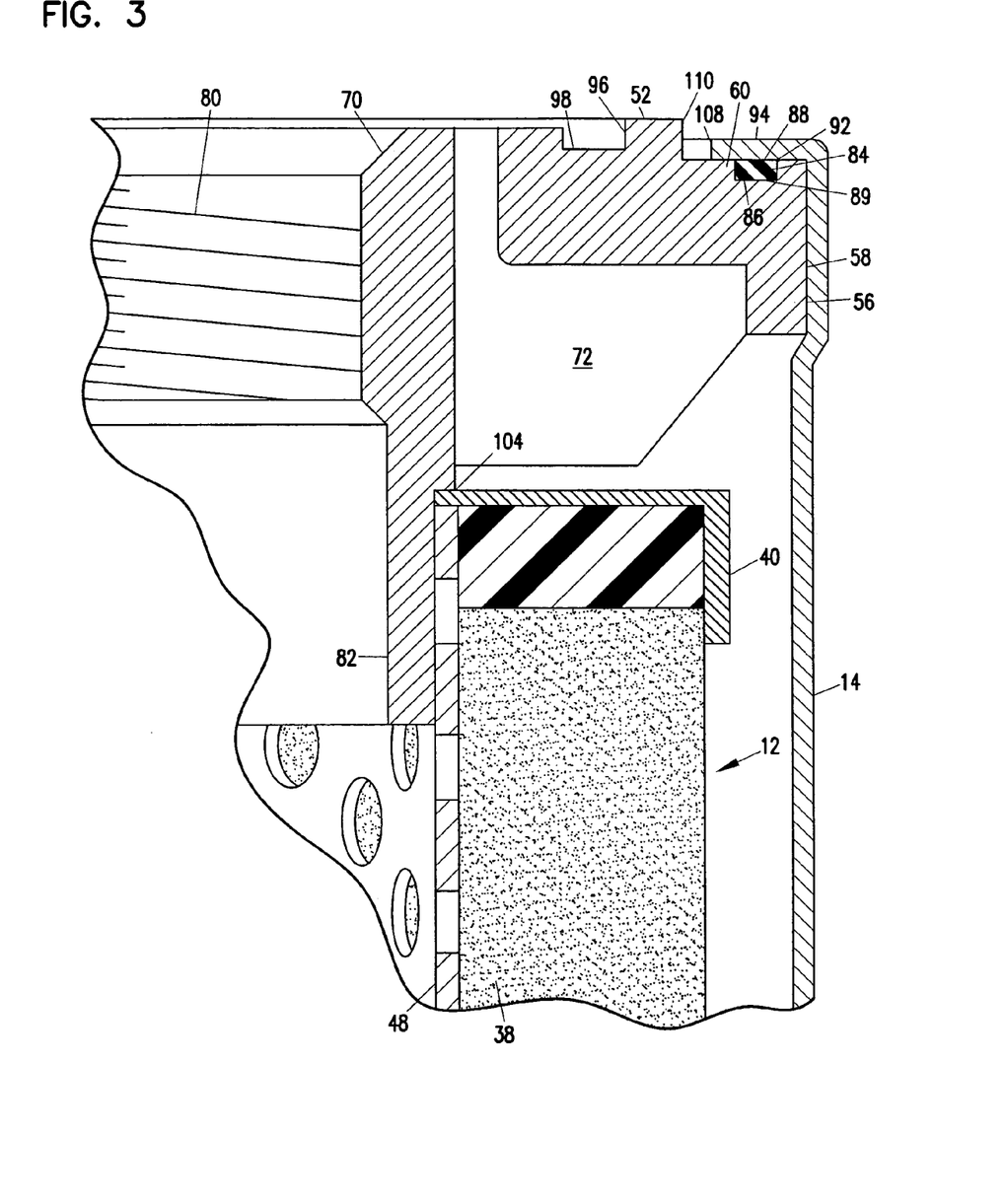
FIG. 3 is an enlarged view of a portion of the cross-sectional view depicted in FIG. 2.
Figure 4:
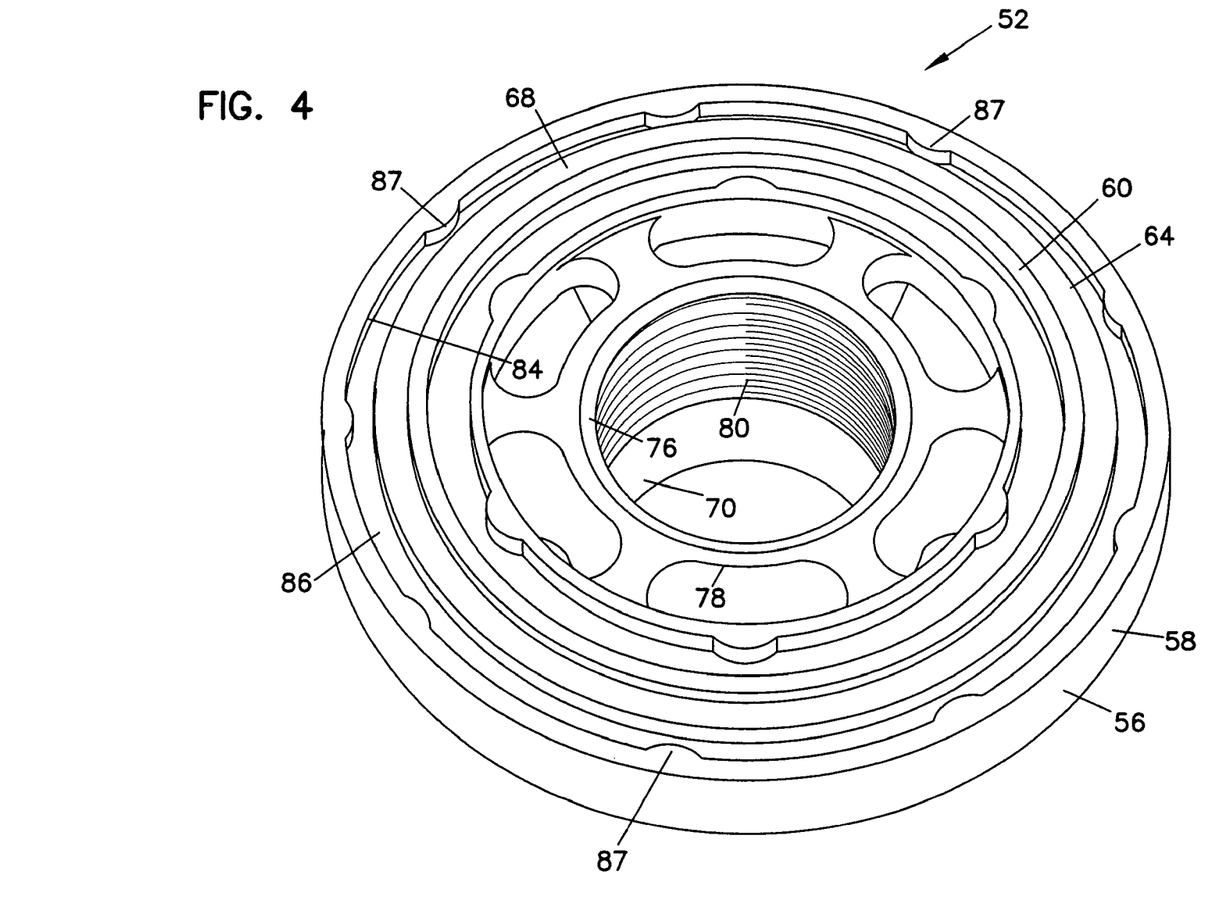
FIG. 4 is a perspective view of the baffle plate utilized in the filter assembly of FIGS. 1–3.

Note that the baffle plate 52 has a smooth, continuous, uninterrupted periphery 56 for its outer wall 58. The outer wall 58 does not have any grooves (i.e., it is "groove-free") or any other seats for holding sealing gaskets therein. Instead, the baffle plate 52 defines a groove 84 in the face 68. As can be seen in FIG. 4, the groove 84 is a continuous circular groove recessed from the top end surface 64 to form a seat 86 for a sealing gasket 88 (FIGS. 2 and 3). In one embodiment, the sealing gasket 88 may be an O-ring gasket. Preferably, the sealing gasket 88 is a lathe-cut gasket 89. The sealing gasket 88 is compressed between the baffle plate 52 and the housing 14 to form a seal 92 (FIG. 3) therebetween. In FIGS. 2 and 3, it can be seen how the housing 14 is engaged against the baffle plate 52 continuously and uninterrupted along the edge 56 and outer wall 58 and then is bent orthogonally thereto to extend over at least a portion of the axial surface 60 of the baffle plate 52. The bent portion 94 of the housing 14 forms seal 92 against the gasket 88. The bent portion defines an end tip 108 (FIG. 3). The end tip 108 is spaced from a wall 110 that defines a second groove 96 (described below). Lining the groove and extending over it is a plurality of protrusions 87 (FIG. 4). Protrusions 87 help to hold the gasket 88 in place before the seaming operation (bending the housing 14 thereover).

By locating the sealing groove 84 in the face 68 of the baffle plate 52 instead of along the circumferential edge 56, the gasket 88 is located in seat 86 that is cast into the face 68 of the baffle plate 52 instead of being machined into the perimeter of it (as shown in the prior art, FIG. 6). As a result, machining time is reduced, the porosity that is exposed is negligible, and the step of impregnating with Loctite material is eliminated. Further, the gasket 88 is compressed by the seaming operation of bending the housing 14 to form bent portion 94 against the axial surface 60 of the baffle plate 52. This eliminates an extra step of compressing the sealing gasket 218 into the groove 216 (FIG. 6).

Before connection to the filter head 16, there is another sealing gasket mounted within the baffle plate 52. In particular, the baffle plate 52 includes second groove 96 to form a second seat 98 to receive a sealing gasket (not shown) therein. This sealing gasket forms a seal with the filter head 16.

D. Methods

In operation, the filter assembly 10 works as follows: in a forward-flow operation, fluid to be cleaned enters the filter head through inlet 22. From there, it flows through the openings 78 in the baffle plate 52 and into the open interior volume 32 of the filter housing 14. From there, the fluid is forced to flow through the filter media 46 and into the open interior volume 44. The fluid is prevented from bypassing flowing through the filter media 46 due to a seal 102 formed between the filter element 12 and the neck 82 of the baffle plate 52. The seal 92 between the baffle plate 52 and the housing 14 prevents leakage to the outside.

From the open interior volume 44, the cleaned fluid passes through the flow passage 81, which is defined by the interior of the opening 76 of the baffle plate 52. The cleaned fluid then exits the filter assembly 10 and flows through the filter head 16 and out through the outlet 24.

After a period of operation, the filter media 46 will become occluded. The occluded filter media 46 will cause an increase in restriction. At such time, it will become appropriate to change and replace the filter assembly. In order to do this, the filter assembly 10 will be released from the filter head 16 by unscrewing the filter assembly 10 from the filter head 16. This will release a seal formed between the filter head 16 and the second groove 96 of the baffle plate 52. The old filter assembly 10 is discarded and replaced with a new filter assembly 10. The new filter assembly 10 is screwed onto the filter head 16 and filtering can then be restarted.

To assemble the filter assembly 10, the baffle plate 52 is provided. The filter element 12 is made by providing the extension of filter media 46, inner liner 48, and potting the two ends of the filter media 46 into the first and second end caps 40, 42. Preferably, the first end cap 40 is positioned against an engagement surface 104 of the hub 70 prior to placing the filter media 46 into the end cap 40. Adhesive potting material 106 is placed into the end cap 42, and the filter media 46 is positioned into the end cap 42. Next, adhesive potting material 106 is placed into the end cap 40, and the filter media 46 is positioned in the end cap 40. The potting adhesive 106 contacts and bonds to each of the end caps 40, 42, the filter media 46, and the engagement surface 104 of the hub 70. Next, the filter housing 14 is placed over the element 12 having the baffle plate 52 secured thereto. The housing 14 is seamed or bent over the axial surface 60 to form bent portion 94 and to compress the gasket 88 between the bent portion 94 and the baffle plate 52 to form seal 92 therebetween.

What is claimed is:
1. A fluid filter arrangement comprising:
   (a) a filter assembly including:
      (i) a housing having a closed end and an open end; a filter element operably oriented in said housing; a die cast baffle plate mounted to operably cover said housing open end; said baffle plate including a first axial face with an exterior top end surface and an outer circumferential wall circumscribing said first axial face; the first axial face being in a plane orthogonal to the outer circumferential wall;
      (ii) said outer circumferential wall being an outer radial surface, groove-free, and without seats for holding sealing gaskets therein;
      (iii) said first axial face defining at least a first sealing groove;
         (A) the first sealing groove being a continuous groove extending into the first axial face to form a seat;
         (B) the first sealing groove being cast into the first axial face;
      (iv) a sealing gasket oriented in said seat of said first sealing groove;
         (i) said sealing gasket forming a seal between said housing and said baffle plate; and
   (b) a filter head; the filter assembly being operably mounted on the filter head.
2. A fluid filter arrangement according to claim 1 wherein:
   (a) the filter assembly is mounted to the filter head with a threaded connection.
3. A fluid filter arrangement according to claim 1 wherein:
   (a) said filter element includes a first, closed end cap; a second, open end cap; and an extension of pleated filter media secured to said first and second end caps;
      (i) said extension of pleated filter media defining an open filter interior.
4. A fluid filter arrangement according to claim 3 wherein:
   (a) said baffle plate includes a hub defining a central opening therethrough; said hub extending through said second open end cap and into said open filter interior.
5. A fluid filter arrangement according to claim 4 wherein:
   (a) said hub has an internal surface defining threads to connect the filter assembly to the filter head.
6. A fluid filter arrangement according to claim 5 wherein:
   (a) said baffle plate further includes a plurality of radial ribs extending from said hub.
7. A fluid filter arrangement according to claim 1 wherein:
   (a) said housing includes an outer wall and a bent portion;
      (i) said outer wall circumscribing said filter element;
      (ii) said bent portion extending orthogonally to said outer wall;
         (A) said seal is between said bent portion and said baffle plate.
8. A fluid filter arrangement according to claim 1 wherein:
   (a) said bent portion defines an end tip; said end tip being spaced from a wall in said first axial face.

* * * * *